US012571328B2

(12) United States Patent
Gill et al.

(10) Patent No.: US 12,571,328 B2
(45) Date of Patent: Mar. 10, 2026

(54) TURBINE DEPOSIT CLEANER

(71) Applicant: ECOLAB USA INC., St. Paul, MN (US)

(72) Inventors: Jasbir S. Gill, Naperville, IL (US); Dinesh Mantri, Pune (IN)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/386,601

(22) Filed: Apr. 17, 2019

(65) Prior Publication Data

US 2019/0323379 A1 Oct. 24, 2019

Related U.S. Application Data

(60) Provisional application No. 62/659,202, filed on Apr. 18, 2018.

(51) Int. Cl.

| | |
|---|---|
| ***F01D 25/00*** | (2006.01) |
| ***B08B 3/08*** | (2006.01) |
| ***B08B 3/10*** | (2006.01) |
| ***C23G 1/06*** | (2006.01) |

(52) U.S. Cl.

CPC .............. *F01D 25/002* (2013.01); *B08B 3/08* (2013.01); *B08B 3/10* (2013.01); *C23G 1/061* (2013.01); *B08B 2220/00* (2013.01); *B08B 2230/01* (2013.01)

(58) Field of Classification Search

CPC ......... F01D 25/002; C23G 1/061; B08B 3/08; B08B 3/10; B08B 2220/00; B08B 2230/01; C11D 11/0041; C11D 3/042; C11D 3/323; C11D 2111/20

See application file for complete search history.

(56) References Cited

U.S. PATENT DOCUMENTS 2,078,981 A * 5/1937 Stacey .................. A43D 29/00 12/85.1
3,589,859 A 6/1971 Foroulis
3,994,817 A 11/1976 Quintana
4,244,190 A * 1/1981 Lieffers .................... F03G 7/04 60/641.5
4,728,438 A * 3/1988 Featherstone ........... E21B 43/40 60/641.5

(Continued)

FOREIGN PATENT DOCUMENTS

CN 101553508 A 10/2009
CN 103987746 A 8/2014

(Continued)

OTHER PUBLICATIONS

Abstract of KZ 20254 A. (Year: 2008).*

(Continued)

*Primary Examiner* — Alexander Markoff

(74) *Attorney, Agent, or Firm* — Eric D. Babych; Barnes & Thornburg LLP

(57) ABSTRACT

The present disclosure relates to compositions and methods for cleaning silica deposits from a turbine. A method of cleaning a turbine is disclosed that can include contacting a deposit on a surface of the turbine with a composition and removing at least a portion of the deposit from the surface of the turbine. The composition can include a tetrafluoroboric acid and a urea component, and the deposit includes silica.

15 Claims, 3 Drawing Sheets

(56) References Cited

U.S. PATENT DOCUMENTS

| | | | | | |
|---|---|---|---|---|---|
| 4,765,913 | A | * | 8/1988 | Featherstone | C02F 1/54<br>210/717 |
| 5,000,916 | A | | 3/1991 | Vukasovich et al. | |
| 5,082,492 | A | * | 1/1992 | Gallup | C01D 3/16<br>75/712 |
| 5,145,656 | A | * | 9/1992 | Gallup | F24T 10/20<br>75/744 |
| 5,240,687 | A | * | 8/1993 | Gallup | F24T 10/20<br>75/712 |
| 5,656,172 | A | * | 8/1997 | Kitz | C02F 5/08<br>210/698 |
| 5,665,242 | A | * | 9/1997 | Gallup | C02F 5/083<br>422/12 |
| 5,858,245 | A | * | 1/1999 | Gallup | C02F 5/10<br>210/698 |
| 6,478,033 | B1 | * | 11/2002 | Foster | C11D 3/0073<br>134/22.1 |
| 6,491,048 | B1 | * | 12/2002 | Foster | F01D 25/002<br>134/166 R |
| 6,503,334 | B2 | * | 1/2003 | Ruiz | C23G 1/00<br>134/18 |
| 8,389,453 | B2 | * | 3/2013 | Thomson | C11D 3/046<br>134/2 |
| 8,450,257 | B2 | | 5/2013 | Thomson | |
| 8,796,195 | B2 | | 8/2014 | Thomson | |
| 8,859,476 | B2 | | 10/2014 | Thomson | |
| 9,187,354 | B2 | * | 11/2015 | Inoue | C02F 5/08 |
| 9,404,067 | B2 | | 8/2016 | Batton et al. | |
| 9,840,429 | B2 | * | 12/2017 | Takahashi | F28F 19/00 |
| 9,932,255 | B2 | | 4/2018 | Hoots et al. | |
| 10,005,950 | B2 | | 6/2018 | Smith et al. | |
| 10,035,949 | B2 | | 7/2018 | Gill et al. | |
| 2002/0129837 | A1 | * | 9/2002 | Ruiz | F01D 25/002<br>134/18 |
| 2004/0192046 | A1 | | 9/2004 | McFarland et al. | |
| 2005/0016731 | A1 | | 1/2005 | Rae et al. | |
| 2008/0236616 | A1 | * | 10/2008 | Bloch | F22B 37/486<br>134/182 |
| 2009/0042748 | A1 | | 2/2009 | Fuller | |
| 2009/0176689 | A1 | * | 7/2009 | Thomson | C11D 3/323<br>510/465 |
| 2009/0233819 | A1 | | 9/2009 | Fuller et al. | |
| 2011/0079392 | A1 | | 4/2011 | Reyes | |
| 2011/0239649 | A1 | * | 10/2011 | Myougan | F03G 7/04<br>60/641.2 |
| 2012/0260938 | A1 | | 10/2012 | Zack et al. | |
| 2013/0137622 | A1 | | 5/2013 | Borst et al. | |
| 2013/0178405 | A1 | | 7/2013 | Thomson | |
| 2014/0054233 | A1 | | 2/2014 | Harrison | |
| 2014/0128294 | A1 | | 5/2014 | Gatlin et al. | |
| 2014/0296113 | A1 | | 10/2014 | Reyes et al. | |
| 2015/0080282 | A1 | | 3/2015 | Krishna et al. | |
| 2015/0197712 | A1 | | 7/2015 | Ekanayake et al. | |
| 2016/0060576 | A1 | * | 3/2016 | Batton | C11D 11/0041<br>510/109 |
| 2016/0076456 | A1 | | 3/2016 | Ekanayake et al. | |
| 2016/0160111 | A1 | | 6/2016 | Smith et al. | |
| 2016/0272879 | A1 | | 9/2016 | Reddy et al. | |
| 2017/0051194 | A1 | * | 2/2017 | Sommese | C23F 11/14 |
| 2017/0051198 | A1 | * | 2/2017 | Gill | C09K 8/72 |
| 2017/0218261 | A1 | | 8/2017 | Nguyen | |
| 2017/0260442 | A1 | * | 9/2017 | Gill | C23F 11/122 |
| 2017/0335174 | A1 | | 11/2017 | Blattel et al. | |
| 2018/0094538 | A1 | * | 4/2018 | Tibbetts | C23G 1/088 |
| 2018/0155841 | A1 | * | 6/2018 | Thomson | C23F 3/03 |
| 2018/0355492 | A1 | * | 12/2018 | Brooks | C11D 11/0029 |

FOREIGN PATENT DOCUMENTS

| | | | | | |
|---|---|---|---|---|---|
| CN | 104962266 | A | | 10/2015 | |
| CN | 106609133 | A | | 5/2017 | |
| CN | 107912045 | A | | 4/2018 | |
| CN | 111936535 | A | | 11/2020 | |
| JP | H09206733 | A | | 8/1997 | |
| JP | H1068723 | A | | 3/1998 | |
| JP | 2004217779 | A | | 8/2004 | |
| JP | 2007002014 | A | | 1/2007 | |
| JP | 2007154668 | A | | 6/2007 | |
| JP | 1971(S46)-018201 | B1 | | 1/2011 | |
| JP | 2011021543 | A | | 2/2011 | |
| JP | 2017535408 | | * | 11/2017 | |
| JP | 2017535408 | A | | 11/2017 | |
| RU | 2545282 | C2 | | 3/2015 | |
| WO | 200011046 | A1 | | 3/2000 | |
| WO | WO-2008118450 | A1 | * | 10/2008 | F01K 23/106 |
| WO | WO 2009/061487 | A1 | | 5/2009 | |
| WO | WO 2015/077737 | A1 | | 5/2015 | |
| WO | 2016033259 | A1 | | 3/2016 | |
| WO | WO 2017/004177 | A1 | | 1/2017 | |
| WO | 2017031103 | A1 | | 2/2017 | |
| WO | 2017031282 | A1 | | 2/2017 | |

OTHER PUBLICATIONS

IUPAC—trace element T06421 (Year: 2014).*

PCT Invitation to Pay Additional Fees and, Where Applicable, Protest Fee for related PCT/US2019/027838, mailed Jul. 24, 2019, 11 pages.

Harrar, J.E. et al., "On-line tests of organic additives for the inhibition of the precipitation of silica from hypersaline geothermal brine," Conference Report, (Apr. 2, 1979), Report No. UCID-18091, 30 pages.

PCT International Search Report and Written Opinion for PCT/CN2020/132621, mailed Sep. 9, 2021, 11 pages.

PCT International Search Report and Written Opinion for PCT/US2019/024558, mailed Nov. 27, 2019, 14 pages.

E. Febriana et al. "Dissolution of quartz sand in sodium hydroxide solution for producing amorphous precipitated silica," 2020 IOP Conference Series: Materials Science and Engineering, 858 (2020) 012047, 9 pages.

R. Fournier et al. "The solubility of amorphous silica in water at high temperatures and high pressures," American Mineralogist, 62 (1977), pp. 1052-1056.

* cited by examiner

TURBINE DEPOSIT CLEANER

BACKGROUND

1. Field of the Invention

The present invention generally relates to compositions and methods for cleaning silica deposits from a turbine.

2. Description of the Related Art

Geothermal brines and steam can be used as an energy source to generate power and heat structures. Geothermal steam temperatures range from about 185° C. to about 370° C. (about 365° F. to about 700° F.). Steam is separated from the brine using flashing units. Low temperature brines can also be used to produce electricity in binary units (secondary fluid units). The geothermal brines can have a salinity from less than about 1000 ppm to several hundred thousand ppm, and a content of non-condensable gases up to about 6 percent. Depending upon the salt content and application, geothermal fluids may be used directly or through a secondary fluid cycle. The use of geothermal energy as an energy source has risen in importance as other energy sources become less abundant and more expensive. Geothermal energy is a sustainable renewable source of energy, and unlike other renewable sources, is reliably available.

Mineral deposition is a major problem under the severe conditions encountered in the production of geothermal energy and can limit development of geothermal fields. Silicate-based deposits can occur in geothermal systems. For example, silicate-based deposits are a problem in some boilers, evaporators, heat exchangers, and cooling coils. The presence of silica/silicate deposits can significantly reduce system thermal efficiency and productivity, increase operating/maintenance costs, and in some cases lead to equipment failure. Steam generators and evaporators are especially prone to silicate deposits due to operation at elevated temperatures, pH and increased cycles of concentration (COC).

Chemical treatment programs can be used to minimize deposits. Chemistries previously used have been commodity acid or caustic, which usually are not fully effective for dissolving all deposits and scales. Those cleaners can be very hazardous to both equipment and personnel. Hydrofluoric acid is an example of an acid that can effectively clean silica-based deposits, but it is extremely hazardous. Further, those acids corrode metal surfaces. If a chemical wash does not effectively dissolve tenacious deposits, then mechanical cleaning is performed. Mechanical cleaning can be useful for removing flaky deposits but may only polish a more tenacious deposit without removing it and leading to a continued deposition of layers over time. Mechanical cleaning is time consuming, can only be done in easy to reach areas, expensive (e.g., for waste removal/labor costs), and can result in significant lost production.

BRIEF SUMMARY

In some embodiments, a method of cleaning a turbine is disclosed. The method includes contacting a deposit on a surface of the turbine, with a composition comprising a tetrafluoroboric acid and a urea component, wherein the deposit comprises silica; and removing at least a portion of the deposit from the surface of the turbine.

In some embodiments, the method can include adding the composition to a stream carrying steam to the turbine.

In some embodiments, the method can include adding the composition to a wash water stream and contacting the deposit with the composition and the wash water stream.

In some embodiments, the method can include adding the composition and the wash water stream to steam flowing to the turbine.

In some embodiments, the method can include adding the composition to a wash water stream so that the tetrafluoroboric acid and the urea component together have a concentration in the wash water stream of about 2% by weight to about 20% by weight.

In some embodiments, the composition and the wash water stream are added to the steam until the turbine reaches a predetermined speed.

In some embodiments, the deposit comprises from about 25% by weight to about 95% by weight of the silica.

In some embodiments, the silica in the deposit is crystalline or amorphous.

In some embodiments, the deposit can include a component selected from iron oxide, iron sulfide, elemental sulfur, and any combination thereof.

In some embodiments, the deposit can include about 25% by weight to about 95% by weight of the silica, about 1% by weight to about 20% by weight of iron oxide, about 1% to about 15% by weight of iron sulfide, and about 1% by weight to about 10% by weight of elemental sulfur.

In some embodiments, the composition can have a mole ratio of the urea component to the tetrafluoroboric acid of about 1 to about 3.

In some embodiments, the compositions further comprise a surfactant selected from the group consisting of alcohol alkoxylates; alkylphenol alkoxylates; block copolymers of ethylene, propylene and butylene oxides; alkyl dimethyl amine oxides; alkyl-bis(2-hydroxyethyl) amine oxides; alkyl amidopropyl dimethyl amine oxides; alkylamidopropyl-bis (2-hydroxyethyl) amine oxides; alkyl polyglucosides; polyalkoxylated glycerides; sorbitan esters; polyalkoxylated sorbitan esters; alkoyl polyethylene glycol esters and diesters; and any combination thereof.

In some embodiments, the composition further comprises a corrosion inhibitor.

In some embodiments, the composition further comprises a solvent.

In other embodiments, a method of cleaning a turbine is disclosed. The method can include contacting a deposit that is disposed on a surface of the turbine, with a composition comprising a base, an alkali metal salt of a chelating ligand, such as gluconic acid, and optionally a $C_8$-$C_{10}$ polyglycoside, wherein the deposit comprises silica; and removing at least a portion of the deposit from the surface of the turbine.

In certain embodiments, the method can include adding the composition to a wash water stream so that the $C_8$-$C_{10}$ polyglycoside has a concentration in the wash water stream of about 2% by weight to about 20% by weight.

In some embodiments, the methods disclosed herein can include monitoring removal of the deposit from the turbine in an off-line cleaning process by determining a concentration of silica and iron in a solution sample.

In some embodiments, the methods disclosed herein can include monitoring removal of the deposit from the turbine in an on-line cleaning process by monitoring system pressure or power generation.

In other embodiments, the present application discloses a use of a composition comprising a tetrafluoroboric acid and a urea component for removing deposits comprising silica from a turbine.

In other embodiments, the present application discloses a use of a composition comprising a $C_8$-$C_{10}$ polyglycoside for removing deposits comprising silica from a turbine.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
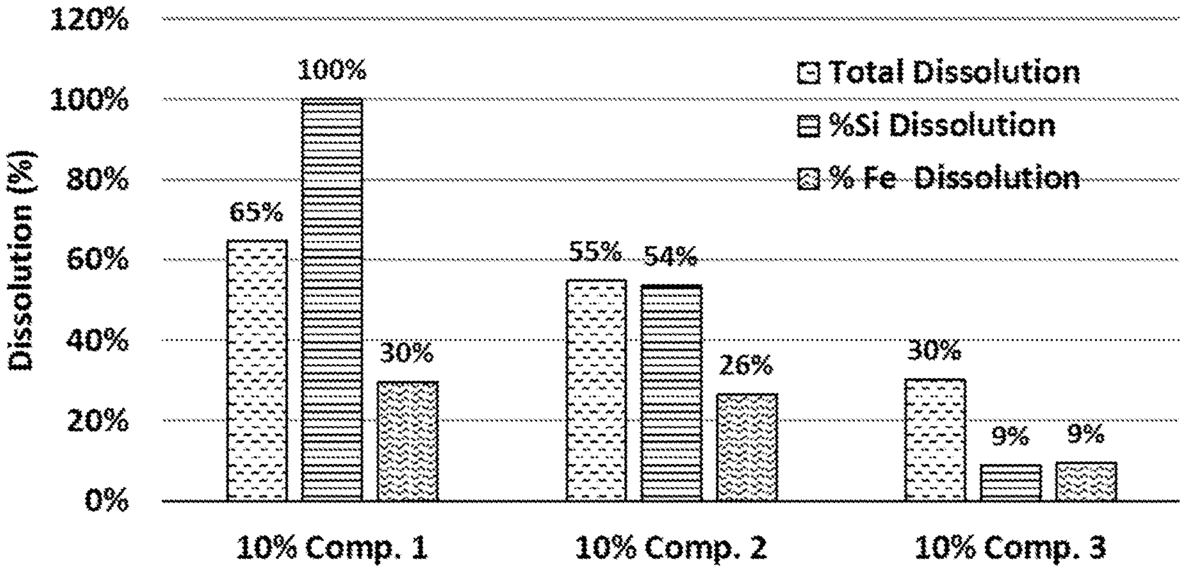
FIG. 1 shows total % dissolution based on residue analysis and $SiO_2$ and iron dissolution based on filtrate analysis.

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

In some embodiments, a method of cleaning a turbine is disclosed. The method can include contacting a deposit on a surface of the turbine with a composition comprising a tetrafluoroboric acid and a urea component. The method can include removing at least a portion of the deposit from the surface of the turbine. The deposit can include silica.

The tetrafluoroboric acid, commonly referred to as fluoroboric acid ($HBF_4$), can be combined with an organic nitrogenous base component to form the corresponding tetrafluoroborate salt.

The nitrogen base can be urea, biuret, an alkyl urea, an alkanolamine, an alkylamine, a dialkylamine, a trialkylamine, an alkyltetramine, a polyamine, an acrylamide, a polyacrylamide, a vinyl pyrrolidone, a polyvinyl pyrrolidone, or a combination thereof.

The composition can comprise a tetrafluoroboric acid and a urea component. Consistent with the broader aspects of the present disclosure, one or more substantially equivalent bases, in terms of basic strength, or compounds imparting basic functionality may be used in place of or in combination with urea. Examples of other such base components include, but are not limited to, biuret (urea dimer) and other soluble urea compounds, alkyl urea derivatives, alkanolamines, including triethanolamine, diethanolamine, and monoethanolamine.

Unless otherwise indicated, "alkyl" as described herein alone or as part of another group is an optionally substituted linear saturated monovalent hydrocarbon radical or an optionally substituted branched saturated monovalent hydrocarbon radical. Linear or branched alkyl groups may have anywhere from 1 to 32 carbon atoms. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, i-hexyl, s-hexyl, t-hexyl, and the like.

The compositions can have a molar ratio of the urea component to tetrafluoroboric acid used to prepare the salt of about 1:3 to about 5:1, preferably about 1:2 to about 3:1. The composition can have a mole ratio of the urea component to the tetrafluoroboric acid of about 1 to about 3.

The nitrogen base, for example the urea component, can react with the tetrafluoroboric acid to form the salt of a nitrogen base such as urea tetrafluoroborate. The relative amounts and/or concentrations of the tetrafluoroboric acid and the urea component in the compositions of the present disclosure can vary widely, depending on the desired function of the composition and/or the required cleaning activity.

The salt of a urea component and the tetrafluoroboric acid is disclosed in U.S. Pat. Nos. 8,389,453 and 8,796,195, the contents of which are incorporated by reference into the present application in their entirety, and is commercially available from Nalco-Champion as product no. EC6697A and from Nalco Water as GEO991.

The concentration of salt of a urea component and the tetrafluoroboric acid in the composition can be from about 5 wt. % to about 90 wt. %, from about 10 wt. % to about 80 wt. %, from about 50 wt. % to about 70 wt. %, from about 50 wt. % to about 60 wt. %, from about 60 wt. % to about 90 wt. %, from about 60 wt. % to about 80 wt. %, from about 60 wt. % to about 70 wt. %, from about 70 wt. % to about 90 wt. %, from about 80 wt. % to about 90 wt. %, or from about 70 wt. % to about 80 wt. %.

In certain geothermal power plants, a stream carrying steam extracted from a geothermal well can be fed to a turbine to generate electricity. In some embodiments, the turbine can be driven by steam from a geothermal source.

In some embodiments, the method can include adding the composition to a stream carrying steam to a turbine. The composition can be added upstream from the turbine but after any unit used to separate condensate from steam. The composition can be injected as a liquid and can contact the turbine during on-line operation of the power generation process.

In some embodiments, the method can include adding the composition to a wash water stream and contacting the deposit with the composition and the wash water stream. The wash water stream is an aqueous stream that can be added to the steam being fed to the turbine.

In some embodiments, the method can include adding the composition and a wash water stream to the stream carrying steam to the turbine.

In some embodiments, the method can include adding the composition to a wash water stream so that the tetrafluoroboric acid and the urea component together have a concentration in the wash water stream of about 2% by weight to about 20% by weight. In some embodiments, the concentration of the tetrafluoroboric acid and the urea component in the wash water stream is about 10% by weight.

Further, the weight ratios and/or concentrations utilized can be selected to achieve a composition and/or system having the desired cleaning characteristics.

In some embodiments, the composition and the wash water stream are added to the steam until the turbine reaches a predetermined speed. The predetermined speed of turbine can be readily determined by one of ordinary skill in the art and is generally the design speed of the turbine. A turbine with few to no deposits will rotate at or close to the design speed of the turbine. A turbine with deposits will rotate more slowly, thereby affecting power generation.

In some embodiments, the method can include monitoring removal of the deposit from the turbine in an on-line cleaning process by monitoring system pressure or power generation.

In some embodiments, the method can include monitoring removal of the deposit from the turbine in an off-line cleaning process by determining a concentration of silica and iron in a solution sample. When the turbine is off-line or not generating power, the composition can be diluted in a solvent such as wash water or any other suitable solvent and sprayed onto the turbine to contact the deposit.

In some embodiments, the composition can include a solvent. Suitable solvents include, but are not limited to, alcohols, hydrocarbons, ketones, ethers, aromatics, amides, nitriles, sulfoxides, esters, glycol ethers, aqueous systems, and combinations thereof. In certain embodiments, the solvent is water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, etc.), ketones (cyclohexanone, diisobutylketone), N-methylpyrrolidinone (NMP), N,N-dimethylformamide and the like. Representative non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

The composition and wash water can be recirculated until the effluent is saturated with silica and/or iron. The effluent includes the composition, wash water, and any dissolved or suspended deposit components.

The cleaning progress for off-line cleaning can be determined by taking solution samples of the effluent periodically and measuring the concentration of silica and iron using wet chemistry colorimetric assays and pH. If the pH is above 5.5, additional product may be need to be applied onto the turbine. Once it is determined, that the cleaning effluent is saturated with silica and iron, the system can be drained and fresh product can be added.

The deposit can be composed of from about 25% by weight to about 95% by weight of the silica. In some embodiments, the deposit can be composed of from about 50% by weight to about 95% by weight of the silica, from about 60% by weight to about 95% by weight of silica, or about 70% by weight to about 95% by weight of silica. The deposit can include silica, iron oxide, iron sulfide, elemental sulfur, and any combination thereof.

In some embodiments, the deposit can include about 25% by weight to about 95% by weight of the silica, about 1% by weight to about 20% by weight of iron oxide, about 1% to about 15% by weight of iron sulfide, and about 1% by weight to about 10% by weight of elemental sulfur.

In some embodiments, the silica in the deposit is crystalline, amorphous, or a mixture of crystalline and amorphous. In some embodiments, the silica in the deposit is crystalline.

Without being bound by any particular theory, the deposit on the turbine results from drying of minerals in the wet steam onto the turbine blades or from volatized silica depositing onto the turbine. By nature, these deposits are hard and quartz-like. Silica deposits in other parts of the geothermal system form due to changes in temperature of fluids that are supersaturated with respect to silica. Deposits that form from supersaturated solutions often appear in heat exchangers or boilers.

The compositions comprising a tetrafluoroboric acid and a urea component can be used for removing deposits comprising silica from a turbine.

In some embodiments, any composition disclosed herein can include a surfactant. Examples of surfactants that can be used include, but are not limited to, alcohol alkoxylates; alkylphenol alkoxylates; block copolymers of ethylene, propylene and butylene oxides; alkyl dimethyl amine oxides; alkyl-bis(2-hydroxyethyl) amine oxides; alkyl amidopropyl dimethyl amine oxides; alkylamidopropyl-bis(2-hydroxyethyl) amine oxides; alkyl polyglucosides; polyalkoxylated glycerides; sorbitan esters; polyalkoxylated sorbitan esters; alkoyl polyethylene glycol esters and diesters; or any combination thereof.

In some embodiments, any composition disclosed herein can include a corrosion inhibitor. Suitable corrosion inhibitors for inclusion in the compositions include, but are not limited to, alkyl, hydroxyalkyl, alkylaryl, arylalkyl, or arylamine quaternary salts; mono or polycyclic aromatic amine salts; imidazoline derivatives; mono-, di-, or tri-alkyl or alkylaryl phosphate esters; phosphate esters of hydroxylamines; phosphate esters of polyols; and monomeric or oligomeric fatty acids.

Suitable alkyl, hydroxyalkyl, alkylaryl, arylalkyl, or arylamine quaternary salts include those alkylaryl, arylalkyl, and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain 1 to 18 carbon atoms, and X is Cl, Br, or I. In certain embodiments, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, and any combination thereof. In certain embodiments, the quaternary ammonium salt is an alkylamine benzyl quaternary ammonium salt, a benzyl triethanolamine quaternary ammonium salt, or a benzyl dimethylaminoethanolamine quaternary ammonium salt.

The corrosion inhibitor can be a monomeric or oligomeric fatty acid, such as $C_{14}$-$C_{22}$ saturated and unsaturated fatty acids, as well as dimer, trimer and oligomer products obtained by polymerizing one or more of such fatty acids.

The corrosion inhibitor can be a triazole. The triazole may be selected from the group consisting of: benzotriazole, tolyltriazole, butylbenzotriazole, halobenzotriazoles, halotolyltriazoles, nitrated-triazoles, and combinations thereof.

The corrosion inhibitor can be a 2-substituted benzimidazole.

In some embodiments, the corrosion inhibitor can include benzyl-($C_{12}$-$C_{16}$ alkyl)-dimethyl-ammonium chloride. In some embodiments, the corrosion inhibitor comprises benzyl-($C_{12}$-$C_{16}$ alkyl)-dimethyl-ammonium chloride, an ethoxylated alcohol phosphate salt, an imidazoline salt, 2-mercaptoethanol, ethylene glycol, diethylene glycol, methanol, 2-butoxyethanol, and water. In some embodiments, the corrosion inhibitor comprises sodium gluconate.

When the composition includes a corrosion inhibitor, the corrosion inhibitor can be present in an amount as follows based on the total concentration of the aqueous mixture to which the composition is added. Thus, the corrosion inhibitor can be used at a concentration of from about 1 ppm to about 1000 ppm, from about 1 ppm to about 800 ppm, from about 1 ppm to about 600 ppm, from about 1 ppm to about 500 ppm, from about 1 ppm to about 400 ppm, from about 1 ppm to about 200 ppm, from about 5 ppm to about 1000 ppm, from about 5 ppm to about 800 ppm, from about 5 ppm to about 600 ppm, from about 5 ppm to about 500 ppm, from about 5 ppm to about 400 ppm, or from about 5 ppm to about 200 ppm.

In other embodiments, a method of cleaning a turbine is disclosed that can include contacting a deposit that is disposed on a surface of the turbine with a composition comprising a base, an alkali metal salt of a chelating ligand, such as gluconic acid, and optionally a $C_8$-$C_{10}$ polyglycoside. The method also includes removing at least a portion of the deposit from the surface of the turbine. In some embodiments, the entire deposit (or substantially the entire deposit) is removed from the surface of the turbine. The deposit can include silica.

In some embodiments, the method can include adding the composition to a wash water stream so that the $C_8$-$C_{10}$ polyglycoside has a concentration in the wash water stream of about 2% by weight to about 20% by weight. In some embodiments, the $C_8$-$C_{10}$ polyglycoside has a concentration in the wash water stream of about 10% by weight.

The compositions optionally comprising a $C_8$-$C_{10}$ polyglycoside can include other additives such as chelants (e.g., glycols), phosphates, nitrilotriacetic acid, citrates, polymers of acrylic and maleic acid, sulfamic acid, methyl sulfamic acid, hydroxy phosphono acetic acid, and sodium hydroxide.

The compositions optionally comprising a $C_8$-$C_{10}$ polyglycoside can be used for removing deposits comprising silica from a turbine.

When cleaning the turbine off-line with compositions optionally comprising a $C_8$-$C_{10}$ polyglycoside, the solution pH can be monitored. If the pH is below about 12, additional composition may be need to be added onto the turbine. Once it is determined that the cleaning effluent is saturated with silica and iron, the system can be drained and add fresh composition can be added.

In some embodiments, the compositions disclosed herein can include a sulfur dispersant. The sulfur dispersant can include a $C_5$-$C_{25}$ alkyl polyglycoside. Alkyl polyglycosides are non-ionic and may include a hydrophilic sugar and an alkyl group of variable carbon chain length that is hydrophobic.

As used herein, "disperse" and "dispersing" denote suspending solids in a fluid, removing solids from a surface, or maintaining solids in a fluid suspension.

In some embodiments, the sulfur dispersant may include a $C_{10-16}$ alkyl polyglycoside. In certain embodiments, the sulfur dispersant may be $C_{12}$ alkyl polyglycoside, $C_{13}$ alkyl polyglycoside, $C_{14}$ alkyl polyglycoside, $C_{15}$ alkyl polyglycoside, $C_{16}$ alkyl polyglycoside, and any combination thereof.

In some embodiments, the sulfur dispersant may be a mixture of two alkyl polyglycosides with different alkyl chain lengths such as $C_{10-16}$ alkyl polyglycoside and $C_{8-10}$ alkyl polyglycoside. When the sulfur dispersant is a mixture of two or more alkyl polyglycosides, then the alkyl polyglycosides may be added separately at the same or different locations or they may be mixed together before addition into the system. In certain embodiments, the sulfur dispersant consists of water, $C_{10-16}$ alkyl polyglycoside, and $C_{8-10}$ alkyl polyglycoside.

In some embodiments, the sulfur dispersant may be added to the wash water in an amount of about 0.01 ppm to about 1000 ppm, about 0.01 ppm to about 500 ppm, about 0.01 ppm to about 250 ppm, about 0.01 ppm to about 150 ppm, about 0.01 ppm to about 50 ppm, about 0.01 ppm to about 25 ppm, about 0.01 ppm to about 5 ppm, or about 0.1 ppm to about 2 ppm. In some embodiments, the sulfur dispersant may be added to the wash water in an amount of about 1 ppm to about 10 ppm.

In some embodiments, the method may include adding a polymer dispersant to the wash water. The polymer dispersant may be added simultaneously with the sulfur dispersant. The polymer dispersant may include acrylic acid and 2-acrylamido-2-methylpropane sulfonic acid. The polymer dispersant may be a polymer comprising about 50-70 wt % acrylic acid and about 30-50 wt % 2-acrylamido-2-methylpropane sulfonic acid. The weight average molecular weight of the polymer can be about 5,000 Da to about 50,000 Da. In some embodiments, the polymer may have a weight average molecular weight of about 20,000 Da.

In some embodiments, any composition disclosed herein can include an anti-foaming agent. Examples of anti-foaming agents include, but are not limited to, $C_5$-$C_{25}$ alkyl alcohol, $C_5$-$C_{25}$ alkyl alcohol ethoxylate, monobasic aluminum stearate, stearic acid, polydimethylsiloxane, sorbitan monostearate, hydrated silica, ethoxylated sorbitan monostearate, xanthan gum, and amorphous silica. In some embodiments, the anti-foaming agent may include water, polydimethylsiloxane, and sorbitan monostearate. In other embodiments, the anti-foaming agent may consist of water, polydimethylsiloxane, sorbitan monostearate, hydrated silica, ethoxylated sorbitan monostearate, and xanthan gum.

In some embodiments, the anti-foaming agent may be added to the wash water in an amount of about 0.001 ppm to about 100 ppm. In some embodiments, the anti-foaming agent may be added to the process water in an amount of about 0.001 ppm to about 10 ppm, about 0.001 ppm to about 5 ppm, about 0.01 ppm to about 10 ppm, about 0.05 ppm to about 5 ppm, about 0.05 ppm to about 2 ppm, about 0.05 ppm to about 10 ppm, or about 0.1 ppm to about 1 ppm.

In some embodiments, the compositions disclosed herein can include an inert fluorescent tracer, making it compatible with fluorescent tracing technology, such as 3D TRASAR® technology (available from Nalco® Company, Naperville, Ill., USA). In other embodiments, an inert fluorescent tracer may be included in the composition to provide a means of determining the dosage level.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

At least one advantage of the compositions and methods disclosed herein is that the turbine surface experiences reduced corrosion as compared to turbines treated with a conventional acid composition such as, for example, hydrochloric acid, hydrofluoric acid, or sulfuric acid. Using the compositions disclosed herein can reduce metal loss from the turbine compared to using hydrochloric acid, hydrofluoric acid, sulfuric acid, organic acids, and the like.

EXAMPLES

Example 1

The dissolution (cleaning) performance of several compositions was tested against a turbine deposit. The major focus was on the effectiveness of the chemistry to dissolve the deposit.

A deposit sample from turbine used in a geothermal power plant. The turbine was in contact with steam. Prior to analysis the deposits were dried at about 105° C. The deposit was analyzed using X-ray fluorescence and X-ray diffraction. X-ray fluorescence showed that the deposit contained mainly silicon, iron and sulfur as shown in Table 1. XRD analysis confirmed that the major component of the deposit is quartz silica, and trace components of iron sulfide, iron oxide, and elemental iron as shown in Table 2. Gravimetric tests showed a mass loss of about 2 wt % at about 925° C.

TABLE 1

Elemental analysis by X-ray fluorescence

| Element | Weight percent |
|---|---|
| Silicon ($SiO_2$) | 79% |
| Iron ($Fe_2O_3$) | 10% |
| Sulfur ($SO_3$) | 6% |
| Chromium ($Cr_2O_3$) | 1% |
| Sodium ($Na_2O$) | 1% |
| Total | 98%* |

*Total from XRF + loss at 925° C. = 100%

TABLE 2

Elemental analysis by X-ray diffraction

| Element | |
|---|---|
| Silica (quartz) | major |
| Iron sulfide (Pyrite; $FeS_2$) | trace |
| Iron oxide (Magnetite; $Fe_3O_4$) | trace |
| Elemental iron (Fe) | trace |

Dissolution Test Procedure

The test procedure described below was followed in the lab to understand the efficacy of chemicals for dissolving the deposit. Higher % dissolution capability means better performance in cleaning the deposit.

A 10% solution (wt/wt) was prepared of each deposit dissolver. Composition 1 was a urea stabilized tetrafluoroborate compound (commercially available commercially from Nalco-Champion as Product No. EC6697A and from Nalco Water as GE0991). Composition 2 had about 0.2 wt % $C_8$-$C_{10}$ polyglycoside, about 3 wt % sodium gluconate, about 0.7 wt % hexasodium nitrilotris(methylenephosphonate), about 0.02 wt % of ethoxylated propoxylated alcohol, about 65 wt % water, about 31 wt % sodium hydroxide, and about 0.0005 wt % polyethylene glycol. Composition 3 had about 60 wt % water, about 38 wt % tetrasodium EDTA, and about 2 wt % sodium hydroxide.

The deposit sample was crushed coarsely into fragments and dried to remove moisture. A weighed amount (wt-Initial) of the dried deposit sample was transferred into a 250-mL plastic bottle. About 200 grams of 10% solution of the required scale dissolver was added to their respective bottle. All the test bottles were kept in a shaker and maintained at the desired temperature for several hours. After specific intervals, an aliquot from each bottle was withdrawn and filtered. The filtrate was then analyzed. At the end of the dissolution period, the entire bottle contents were filtered. Filter papers along with residue were dried until no further weight loss was observed and weighed (wt-final). The % dissolution was calculated as (wt-initial−wt-final)×100/wt-initial.

Figure 2:
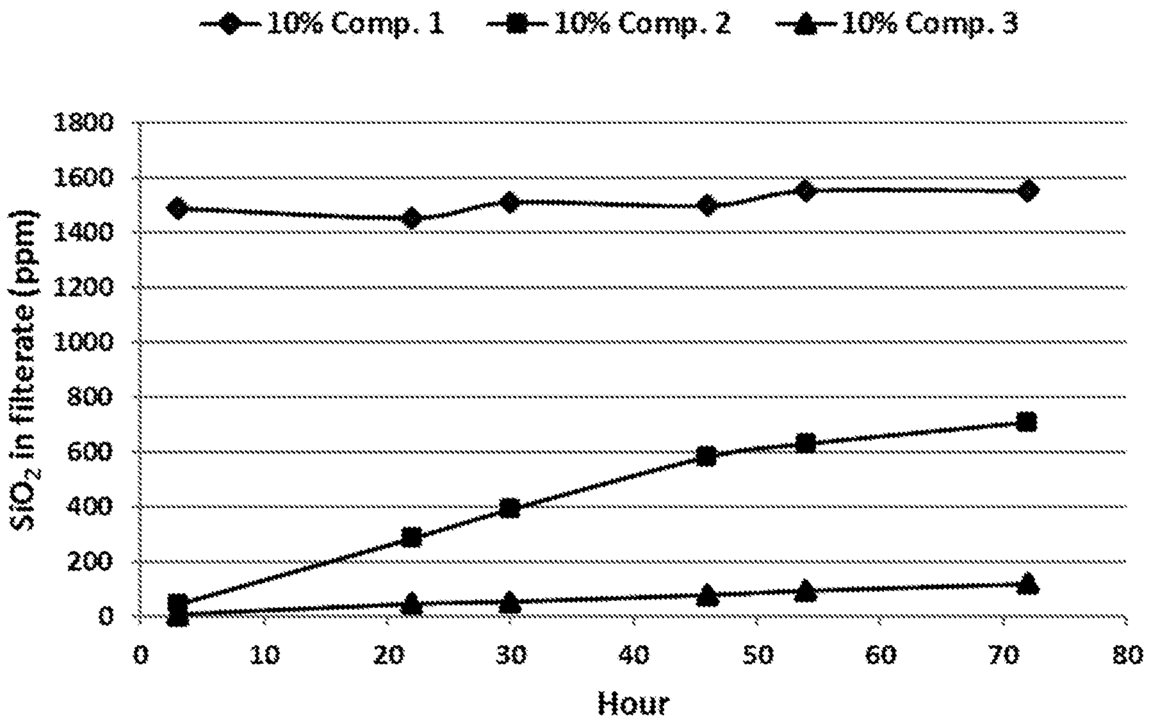
FIG. 2 shows the concentration of $SiO_2$ (ppm) in filtrate with time.
Figure 3:
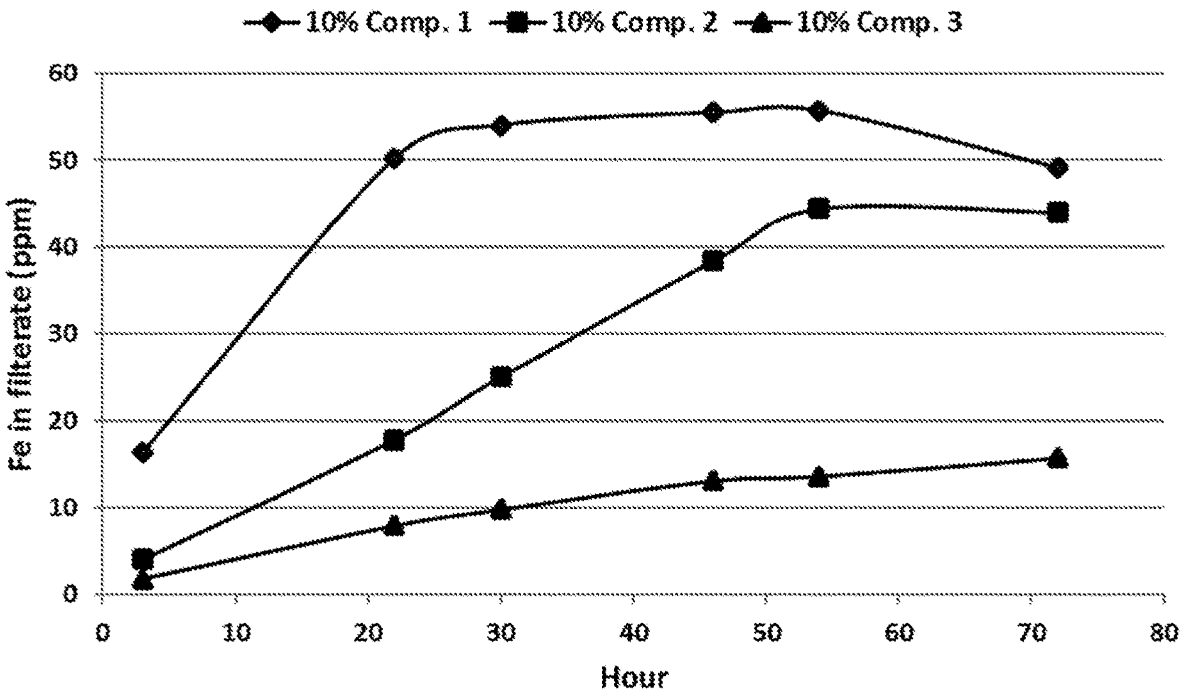
FIG. 3 shows expected iron (ppm) in filtrate with time.

FIG. 1 shows the total % dissolution based on residue analysis and $SiO_2$ and Fe dissolution based on filtrate analysis. FIG. 2 and FIG. 3 show the concentration of $SiO_2$ and iron in the solution sample at specific time intervals. If 100% of the deposit was dissolved then the filtrate should have about 1316 ppm of $SiO_2$ (assuming that about 79% of the deposit was silica) and about 166 ppm of iron (assuming about 10% iron in the deposit).

Any composition disclosed herein may comprise, consist of, or consist essentially of any of the compounds/components disclosed herein. In accordance with the present disclosure, the phrases “consist essentially of,” “consists essentially of,” “consisting essentially of,” and the like limit the scope of a claim to the specified materials or steps and those materials or steps that do not materially affect the basic and novel characteristic(s) of the claimed invention.

As used herein, the term “about” refers to the cited value being within the errors arising from the standard deviation found in their respective testing measurements, and if those errors cannot be determined, then “about” refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a dispersant" is intended to include "at least one dispersant" or "one or more dispersants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of cleaning a turbine, comprising:

adding a composition comprising a tetrafluoroboric acid and a urea component to a wash water stream, wherein the tetrafluoroboric acid and the urea component together have a concentration in the wash water stream of about 2% by weight to about 20% by weight;

adding the composition and the wash water stream to steam flowing to the turbine; and contacting a deposit on a surface of the turbine with the composition and the wash water stream during an on-line operation of the turbine, wherein the deposit comprises about 60% by weight to about 95% by weight of silica; thereby removing at least a portion of the deposit from the surface of the turbine, wherein the portion comprises silica.

2. The method of claim 1, wherein the composition comprises a mole ratio of the urea component to the tetrafluoroboric acid of about 1 to about 3.

3. The method of claim 1, wherein the composition further comprises a surfactant selected from the group consisting of alcohol alkoxylates; alkylphenol alkoxylates; block copolymers of ethylene, propylene and butylene oxides; alkyl dimethyl amine oxides; alkyl-bis(2-hydroxyethyl) amine oxides; alkyl amidopropyl dimethyl amine oxides; alkylamidopropyl-bis(2-hydroxyethyl) amine oxides; alkyl polyglucosides; polyalkoxylated glycerides; sorbitan esters; polyalkoxylated sorbitan esters; alkoyl polyethylene glycol esters and diesters; and any combination thereof.

4. The method of claim 1, wherein the composition further comprises a corrosion inhibitor.

5. The method of claim 1, wherein the composition further comprises a solvent.

6. The method of claim 1, wherein the composition and the wash water stream are added to the steam until the turbine reaches a predetermined speed.

7. The method of claim 1, further comprising monitoring removal of the deposit from the turbine during the on-line operation by monitoring system pressure or power generation.

8. The method of claim 1, wherein the deposit further comprises a component selected from iron oxide, iron sulfide, or combination thereof.

9. The method of claim 1, wherein the tetrafluoroboric acid and the urea component together have a concentration in the wash water stream of about 10% by weight.

10. The method of claim 8, wherein the deposit comprises about 1% by weight to about 20% by weight of iron oxide, and about 1% by weight to about 15% by weight of iron sulfide.

11. The method of claim 1, wherein the silica is crystalline silica.

12. The method of claim 1, wherein steam is extracted from a geothermal well.

13. A method of cleaning a turbine, comprising:

adding a composition comprising a tetrafluoroboric acid and a urea component to a wash water stream, wherein the tetrafluoroboric acid and the urea component together have a concentration in the wash water stream of about 2% by weight to about 20% by weight;

adding the composition and the wash water stream to steam flowing to the turbine; and contacting a deposit on a surface of the turbine with the composition and the wash water stream during an on-line operation of the turbine, wherein the deposit comprises about 60% by weight to about 95% by weight of crystalline silica; thereby removing at least a portion of the deposit from the surface of the turbine, wherein the portion comprises silica.

14. The method of claim 1, wherein the composition is added after any unit used to separate condensate from the steam.

15. The method of claim 13, wherein the composition is added after any unit used to separate condensate from the steam.

* * * * *